3,647,794
s-TRIAZINE COMPOUNDS
Gilbert Regnier, Sceaux, Roger Canevari, Clamart, and Michel Laubie, Vaucresson, France, assignors to Societe en nom collectif "Science Union et Cie," Societe Francaise de Recherche Medicale
No Drawing. Filed Sept. 26, 1969, Ser. No. 861,448
Claims priority, application Great Britain, Oct. 2, 1968, 46,802/68
Int. Cl. C07d 55/22
U.S. Cl. 260—249.6                7 Claims

ABSTRACT OF THE DISCLOSURE 1-(4,6-R'-amino-2-s-triazinyl)-4-R-piperazines wherein R' is alkenyl or alkynyl which are optionally substituted and R is hydrogen, phenyl, pyridyl, pyrimidyl, pyrazinyl, benzyl, phenylalkyl or diphenylalkyl which are optionally substituted, having respiratory analeptic properties.

SUMMARY OF THE INVENTION

There are provided novel s-triazine compounds having respiratory analeptic properties in animals which have the general Formula I $$R'-NH-\underset{N}{\overset{NH-R'}{\underset{\|}{\bigwedge}}}-N\underset{}{\bigcirc}N-R$$

wherein R' is selected from the group of moieties having the formula $$-CH_2-CH=C\underset{Z}{\overset{Y}{\diagdown}}$$

wherein Y and Z are selected from the group consisting of hydrogen, halogen and lower alkyl, and from a moiety having the formula $$-CH_2-C\equiv C-X$$

wherein X is hydrogen or lower alkyl, R is hydrogen, phenyl, or substituted phenyl; pyridyl, pyrazinyl, pyrazinyl, or substituted pyrimidyl, substituted pyrazinyl, or substituted pyridyl; benzyl, or substituted benzyl; or phenylalkyl of the formula:

$$\underset{}{\bigcirc}-\underset{(R_1)_q}{\overset{|}{C}}-\underset{(R_2)_q}{\overset{|}{G'}}-CH-(CH_2)_n-$$

wherein $R_1$ and $R_2$ are hydrogen or lower alkyl, G' is a carbon-carbon double bond or a carbon-carbon single bond, $n$ is 0 or 1 and $q$ is 0 or 1 provided that where $q$ is 0, G' is a carbon-carbon double bond and where $q$ is 1, G' is a carbon-carbon single bond, or diphenylalkyl of the formula $$\left(R_3-\underset{}{\bigcirc}-\right)_2=CH-(CH_2)_p-$$

wherein $R_3$ is hydrogen or halo, and $p$ is 0, 1 or 2.

It is to be understood that in the compounds of general Formula I wherein R' is an alkenyl moiety having different substituents at the position Y and Z that compound may exist in cis or trans isomeric forms both of which are considered to be within the scope of the present invention.

Compounds of the present invention may be prepared by condensing a halo derivative of the s-triazine of Formula II $$R'-HN-\underset{N}{\overset{NH-R'}{\underset{\|}{\bigwedge}}}-Cl \qquad (II)$$

wherein R' is as above with a piperazine of the general Formula III $$HN\underset{}{\bigcirc}N-R \qquad (III)$$

wherein R has the meaning set forth above.

DESCRIPTION OF THE PREFERRED EMBODIMENTS

In the novel compounds of general Formula I, the symbols Y and Z as defined in subgroup R' may be hydrogen, halogen, suitably fluorine, chlorine or bromine; alkyl, suitably lower alkyl having from 1 to 5 carbon atoms, such as methyl, ethyl, propyl, isopropyl, butyl, isobutyl, tert-butyl, pentyl and the like, most preferably methyl; and the moiety X may be hydrogen, or lower alkyl having from 1 to 5 carbon atoms such as methyl, ethyl, propyl, butyl, or pentyl, most suitably methyl.

The subgroup R may be hydrogen; phenyl; or substituted phenyl. The substituted phenyl group may include one or more of the preferred substituents in any of the available positions for substitution, however, mono substitution in the 4-position of the phenyl nucleus is especially preferred. Suitable substituents for the phenyl nucleus include halo, preferably bromo, chloro or fluoro; lower alkyl, lower alkoxy, and poly halo lower alkyl wherein the alkyl moiety contains from 1 to 5 carbon atoms, especially preferred however are methyl, methoxy, and trifluoromethyl; and nitro and amino.

Where the subgroup R represents substituted pyridyl, substituted pyrimidyl, or substituted pyrazinyl, the substituting group may be located on one or more of the available carbon atoms in the nucleus, and may be the same or different. Preferred among the substituting groups are lower alkyl or lower alkoxy having from 1 to 5 carbon atoms such as methyl, ethyl, butyl or pentyl; or methoxy, propoxy, butoxy or pentoxy.

Where the moiety R represents substituted benzyl, the benzyl moiety may be substituted in one or more of the available positions on the phenyl nucleus thereof. Among the preferred substituents are halo, suitably bromo, chloro and fluoro; lower alkoxy having from 1 to 5 carbon atoms, especially preferred however being methoxy and most preferred being di- and tri-methoxy; or alkylenedioxy suitably lower alkylenedioxy such as methylenedioxy, ethylenedioxy, propylenedioxy and the like, most suitably, the alkylenedioxy moiety is attached across the 3- and 4-positions of the phenyl nucleus, although the bridging of other carbon atoms in the phenyl nucleus is to be considered within the scope of the present invention.

The moieties $R_1$ and $R_2$ may be hydrogen, or lower alkyl of 1 to 5 carbon atoms, most preferred however being methyl.

The group $R_3$ may be hydrogen, or halogen suitably fluoro, chloro or bromo.

The reaction of the triazine of Formula II and the piperazine of Formula III may be carried out in a polar solvent, namely in a high boiling alcohol, for example, butanol or pentanol or in an aromatic amide, for example dimethylformamide or dimethylacetamide. It is advantageous to carry out the reaction at a temperature within the range of from 120 to 150° C. in the presence of an acceptor for the hydrochloric acid formed during the reaction. This hydrochloric acid may be an alkali metal or alkaline earth metal salt of carbonic acid, for example, sodium or potassium bicarbonate or carbonate or calcium carbonate, or a tertiary organic base, for example, dimethylaniline, pyridine, triethylamine. Alternatively, an excess of the piperazine of Formula III may be used.

The derivatives obtained in this manner are weak bases which may be converted into acid addition salts with acids and these salts are also included in this invention. The acid addition salts are obtained when the derivatives of the invention are reacted with acids in suitable solvents, for example, water or water-miscible alcohols. As acids suitable for the formation of these salts there may be mentioned, for example, hydrochloric, hydrobromic, sulphuric and phosphoric acid, and organic acids, for example, acetic, propionic, maleic, fumaric, tartaric, citric, oxalic, benzoic and methanesulphonic acid.

The derivatives of the present invention may be purified by physical methods, for example, crystallization or chromatography or by chemical methods, for example, formation of addition salts with acids and decomposition of these salts with alkaline agents.

The starting materials were prepared by methods known per se, such, for example, as the method of K. Thomae, French Pat. No. 1,507,062, for the compounds II and the method of R. Baltzly et al., J. Org. Chem. 24, 459 (1959), for the compounds III. Most of the derivatives II and III are known derivatives; when they are new, their physical constants are given in the examples.

The new derivatives of this invention, as well as their acid addition salts, possess valuable pharmacological and therapeutic properties which enable them to be used as medicaments, especially as respiration stimulants.

Their toxicity is low, the $LD_{50}$ studied in the mice varies from 50 to 400 mg./kg. by the intraperitoneal route and from 400 to >2000 mg./kg. by the oral route.

The effect of the new derivatives on the respiration was studied in rats, rabbits, cats and dogs. The oxygen and carbon dioxide level was measured by the method of P. F. Scholander (J. Biol. Chem. 167, 235 (1947)). The products are administered intravenously at doses of 0.1 to 3.0 mg./kg. and per orally at doses of 1 to 5 mg./kg. It was observed in all animal species, that the new derivatives increase the ventilation and the respiratory rhythm and decrease the $CO_2$ level of the arterial blood. This activity is particularly durable and is longer than 6 hours for some of the compounds. No convulsant action, nor direct effect on the bulbar respiratory centers was observed. In fact, the injection in the arteria vertebralis or the intracisternal injection of the products does not modify the respiration. The section of the vagus nerve or the denervation of the glomus caroticum does not abolish their activity, but the section of the vagus nerve combined with the denervation of the glomus caroticum abolishes the respiratory effect. So we can say, that the new derivatives exert their activity on the peripheral receptors of the respiration.

These products, when injected intravenously in dogs at the dose of 0.5 to 5 mg./kg. do not notably modify the blood pressure, nor the musculocutaneous, splanchnic or cerebral blood flow. Thus, they possess a vascular effect enabling them to maintain the blood output in spite of the hyperventilation.

These pharmacological properties and the low toxicity permit the use of the new products in therapy, especially in the treatment of respiratory insufficiency.

The present invention also provides pharmaceutical compositions containing a derivative of the general Formula I or a physiologically tolerable salt thereof, in admixture or conjunction with a suitable pharmaceutical carrier, such as, for example, distilled water, glucose, lactose, talc, starch, cocoa butter. These pharmaceutical compositions may be in the form of tablets, dragees, capsules, suppositories or solutions in order to be administered by the oral, rectal or parenteral route at the doses of 5 to 500 mg., 1 to 5 times in a day.

The following examples illustrate the invention but are not to be construed as limiting.

Example 1.—1-(4,6-bis-allylamino-2-s-triazinyl)-4-piperonylpiperazine dihydrochloride

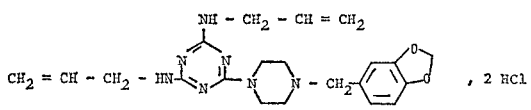

A solution of 10 g. (0.0443 mol) of 4,6-bis(allylamino)-2-chloro-s-triazine, M.P. 204° C. (Kofler) and 19.8 g. (0.0886 mol) of 1-piperonylpiperazine in 300 ml. of anhydrous dimethylformamide are heated under reflux for 9 hours at 150° C. On completion of this operation the solvent is removed under vacuum and the residue taken up in a mixture of 400 ml. chloroform and 400 ml. of water. The organic phase is separated, and repeatedly extracted with aqueous N-methanesulphonic acid and the aqueous acidic layers separated. The aforementioned acidic solutions are then combined and rendered alkaline (pH 10) with dilute aqueous sodium hydroxide, the base extracted with ether, the extract dried over anhydrous potassium carbonate, and filtered. The etheral filtrate, upon evaporation yields the base. Treatment of the base in isopropanol with dry hydrochloric acid followed by recrystallization from isopropanol yields the dihydrochloride of 1[4,6 - bis(allylamino)-2-s-triazinyl]-4-piperonylpiperazine M.P. 228–229° C. (capillary tube).

In accordance with the above procedure, but in place of 1-piperonylpiperazine there is utilized 1-(4-chlorophenyl)piperazine,
1-(2-methylphenyl)piperazine,
1-(3-nitrophenyl)piperazine,
1-(2-aminophenyl)piperazine,
1-(2-methylpyridyl)piperazine,
1-(3-ethoxypyridyl)piperazine,
1-(4-methylpyrimidyl)piperazine,
1-(2-methoxypyrimidyl)piperazine,
1-(2-ethylpyrazinyl)piperazine, and
1-(3-methoxypyrazinyl)piperazine there is obtained the corresponding dihydrochloride of 1-[4,6-bis(allylamino)-2-s-triazinyl]-4-(4-chlorophenyl) piperazine,
1-[4,6-bis(allylamino)-2-s-triazinyl]-4-(2-methylphenyl) piperazine,
1-[4,6-bis(allylamino)-2-s-triazinyl]-4-(3-nitrophenyl) piperazine,
1-[4,6-bis(allylamino)-2-s-triazinyl]-4-(2-aminophenyl) piperazine,
1-[4,6-bis(allylamino)-2-s-triazinyl]-4-(2-methylpyridyl)piperazine,
1-[4,6-bis(allylamino)-2-s-triazinyl]-4-(3-ethoxypyridyl)piperazine,
1-[4,6-bis(allylamino)-2-s-triazinyl]-4-(4-methylpyrimidyl)piperazine,
1-[4,6-bis(allylamino)-2-s-triazinyl]-4-(2-methoxypyrimidyl)piperazine,
1-[4,6-bis(allylamino)-2-s-triazinyl]-4-(2-ethylpyrazinyl)piperazine, and
1-[4,6-bis(allylamino)-2-s-triazinyl]-4-(3-methoxypyrazinyl)piperazine.

In accordance with the above procedure, but wherein place of hydrochloric acid there are utilized hydrobromic, sulphuric, phosphoric, acetic, propionic, maleic, fumaric, tartaric, citric, oxalic, benzoic, and methanesulphonic acids there are obtained the corresponding hydrobromide, sulphate, phosphate, acetate, propionate, maleate, fumarate, tartarate, citrate, oxalate, benzoate, and methanesulphonate of the foregoing compounds.

Examples 2–24

In accordance with the procedure of Example 1 but where in place of 4,6-bis(allylamino)-2-chloro-s-triazine there is utilized 4,6-bis(R'-amino)-2-chloro-s-triazine and wherein place of 1-piperonyl-piperazine there is utilized 1-R-piperazine there is similarly obtained 1-[4,6-bis(R' amino)-2-s-triazinyl]-4-R-piperazine. The results thus obtained are summarized in the table below which indicates the groups R, R' for each preparation as well as the form (salt or base) in which the product was isolated. The melting points indicate the melting points of the product in the isolated form.

| Ex. | R | R' | Isolated form | M.P., °C. (capillary) |
|---|---|---|---|---|
| 2 | 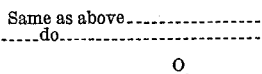 | —CH—CH=C(CH₃)(CH₃) | Dihydrochloride | 222–227 |
| 3 | Same as above | —CH₂—CH=CH.CH₃ | Fumarate | 155–158 |
| 4 | do | —CH₂—C≡CH | Dihydrochloride | 180–220 |
| 5 | 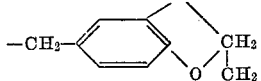 | —CH₂—CH=CH₂ | Fumarate monohydrate | 105–115 |
| 6 | 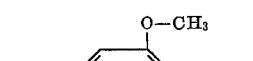 | —CH₂—CH=CH₂ | Fumarate | 105–112 |
| 7 | 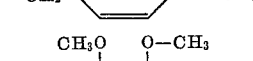 | —CH₂—CH=CH₂ | Dihydrochloride monohydrate | 167–175 |
| 8 |  | —CH₂—CH=CH₂ | Dihydrochloride | 220–225 |
| 9 |  | —CH₂—CH=CH₂ | do | 204–220 |
| 10 | 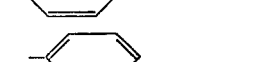 | —CH₂—CH=CH₂ | do | 202–221 |
| 11 | 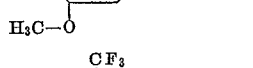 | —CH₂—CH=CH₂ | Base | [1] 115 |
| 12 | 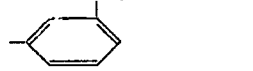 | —CH₂—CH=CH₂ | Dihydrochloride monohydrate | 212–214 |
| 13 |  | —CH₂—CH=CH₂ | Dihydrochloride hemihydrate | 228–232 |
| 14 |  | —CH₂—CH=CH₂ | Dihydrochloride dihydrate | 318–325 |
| 15 | —CH₂—CH₂—⌬ | —CH₂—CH=CH₂ | Dihydrochloride | 239–247 |
| 16 | —CH(CH₃)—CH₂—⌬ | —CH₂—CH=CH₂ | Base | 100–103 |
| 17 | —CH₂—CH=CH—⌬ | —CH₂—CH=CH₂ | Dihydrochloride 2,5 H₂O | 215–222 |
| 18 |  | —CH₂—CH=CH₂ | Bis methane sulfonate | 220–231 |

See footnote at end of table.

TABLE—Continued

| Ex. | R | R' | Isolated form | M.P., °C. (capillary) |
|---|---|---|---|---|
| 19 | 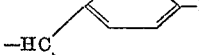 (bis-p-fluorobenzhydryl) | —CH$_2$—CH=CH$_2$ | Base<br>Bis methane sulfonate | 175–180<br>225–227 |
| 20 | 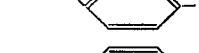 (bis-p-chlorobenzhydryl) | —CH$_2$—CH=CH$_2$ | Bis methane sulfonate | 236–240 |
| 21 | 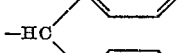 (bis-p-fluorobenzhydryl) | —CH$_2$—CH=CH—CH$_3$ | Bis methane sulfonate | 235–238 |
| 22 | 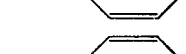 (bis-p-fluorobenzhydryl) | —CH$_2$—CH=CHCl | Base (trans form) | [1] 124 |
| 23 | —(CH$_2$)$_2$—C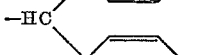 | —CH$_2$—CH=CH$_2$ | Base | 104–108 |
| 24 | H | —CH$_2$—CH=CH$_2$ | Dihydrochloride | 259–263 |

[1] Kofler.

STARTING MATERIALS

The triazines of Examples 2, 3, 4 and 22 and the piperazines of Examples 19 and 20 are novel and are prepared by the method of K. Thomae, French Patent 1,507,062 and Baltzley et al., J. Org. Chem. 24, 459 (1959) respectively and have the following properties:

4,6-bis(dimethylallylamino)-2-chloro-s-triazine, used to prepare the derivative of Example 2, melts at 185° C. (Kofler).

4,6-bis(crotylamino)-2-chloro-s-triazine, used to prepare the derivative of Example 3, melts at 208° C. (Kofler).

4,6-bis(progargylamino)-2-chloro-s-triazine, used to prepare the derivative of Example 4, melts at 245–253° C. (capillary).

4,6-bis(chloroallylamino)-2-chloro-s-triazine, used to prepare the derivative of Example 22, melts at 222–227° C. (capillary).

The dihydrochloride of 1-p,p'-difluorobenzhydryl piperazine, used to prepare the derivative of Example 19, melts at 178–180° C. (capillary).

1-p,p'-dichlorobenzhydryl piperazine, used to prepare the derivative of Example 20, boils at 185–205° C. (under 0.6 mm. Hg).

We claim:

1. A compound selected from the group consisting of (A) s-triazine compounds of the formula

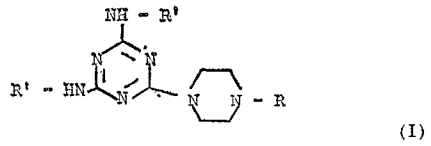

(I)

wherein R' is alkenyl of the formula

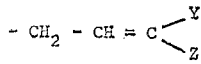

wherein Y and Z are halo, or lower alkyl or hydrogen; and alkynyl of the formula

—CH$_2$—C≡C—X wherein X is hydrogen or lower alkyl; and R is hydrogen, phenyl or (substituted)$_r$ phenyl wherein the substituents are halo, lower alkyl, lower alkoxy, nitro, amino and polyhalo lower alkyl wherein $r$ is an integer from 1–5 and said substituents may be the same or different, pyridyl, pyrimidyl, pyrazinyl or (substituted)$_t$ pyridyl, (substituted)$_u$ pyrimidyl or (substituted)$_u$ pyrazinyl wherein the substituents are lower alkyl or lower alkoxyl, $t$ is an integer from 1–4, and $u$ is an integer from 1–3; benzyl, (halo)$_r$ benzyl, (methoxy)$_r$ benzyl, where $r$ is as above; lower alkylenedioxybenzyl-phenylalkyl of the formula

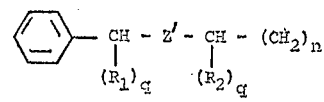

wherein $n$ is selected from 0 and 1, R$_1$ and R$_2$ are selected from hydrogen or lower alkyl, G' is a carbon-carbon single bond or a carbon-carbon double bond provided that where $q$ is 0, G$^1$ is a carbon-carbon doub bond and where $q$ is 1, G' is a carbon-carbon single bond, and diphenylalkyl of the formula

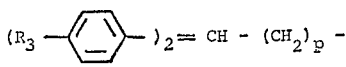

wherein R$_3$ is selected from hydrogen and halogen and p is selected from 0, 1 and 2, and (B) physiologically acceptable addition salts thereof with suitable acids.

2. A compound according to claim 1 wherein Y and Z are methyl, X is methyl and R is chlorophenyl, methylphenyl, methoxyphenyl, trifluorophenyl, chlorophenyl, dimethoxybenzyl, trimethoxybenzyl, methylenedioxybenzyl and ethylenedioxybenzyl.

3. A compound of claim 1 which is 1-(4,6-bis propargylamino-2-s-triazinyl)-4-piperonylpiperazine.

4. A compound of claim 1 which is 1-(4,6-diallylamino-2-s-triazinyl)-4-phenylpiperazine.

5. A compound of claim 1 which is 1-(4,6-diallylamino-2-s-triazinyl)-4-(3-pyrazinyl)piperazine.

6. A compound of claim 1 which is 1-(4,6-diallylamino-2-s-triazinyl)-4-(p,p'-difluorobenzhydryl)piperazine.

7. A compound of claim 1 which is 1-(4,6-bis-chloroallylamino - 2 - s - triazinyl)-4-(p,p'-difluorobenzhydryl) piperazine.

References Cited

UNITED STATES PATENTS

| | | | |
|---|---|---|---|
| 2,712,004 | 6/1955 | Thomas | 260—249.6 X |
| 3,526,622 | 9/1970 | Varsanyi et al. | 260—249.6 X |
| 3,530,121 | 9/1970 | Heimberger | 260—249.6 X |

JOHN M. FORD, Primary Examiner

U.S. Cl. X.R.

424—249

UNITED STATES PATENT OFFICE
CERTIFICATE OF CORRECTION

Patent No. 3,647,794     Dated March 7, 1972

Inventor(s) Gilbert Regnier, Roger Canevari and Michel Laubie

It is certified that error appears in the above-identified patent and that said Letters Patent are hereby corrected as shown below:

Column 3, line 4, delete "aromatic" insert --aliphatic--.

Column 4, line 25, before "chloroform" insert --of--.

Column 5 in the table, Example 5, Column R, delete the formula as shown, insert the following formula:

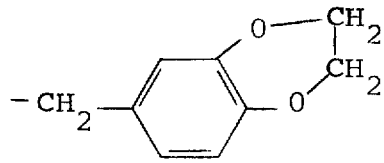

Column 6, Example 6, in the M.P., delete "105-11$^2$" insert -- 105-112 --.

Column 8, line 54, after "alkylenedioxybenzyl" delete "-" insert -- , --.

line 55, in the formula delete "Z" insert --G'--.

line 62, delete "G$^1$ is a carbon-carbon doub", and insert --G' is a carbon-carbon double--.

Signed and sealed this 7th day of November 1972.

(SEAL)
Attest:

EDWARD M. FLETCHER, JR.
Attesting Officer

ROBERT GOTTSCHALK
Commissioner of Patents